May 7, 1929.　　　G. F. ECKART　　　1,712,138
SHOCKLESS DRIVE
Filed Sept. 17, 1926
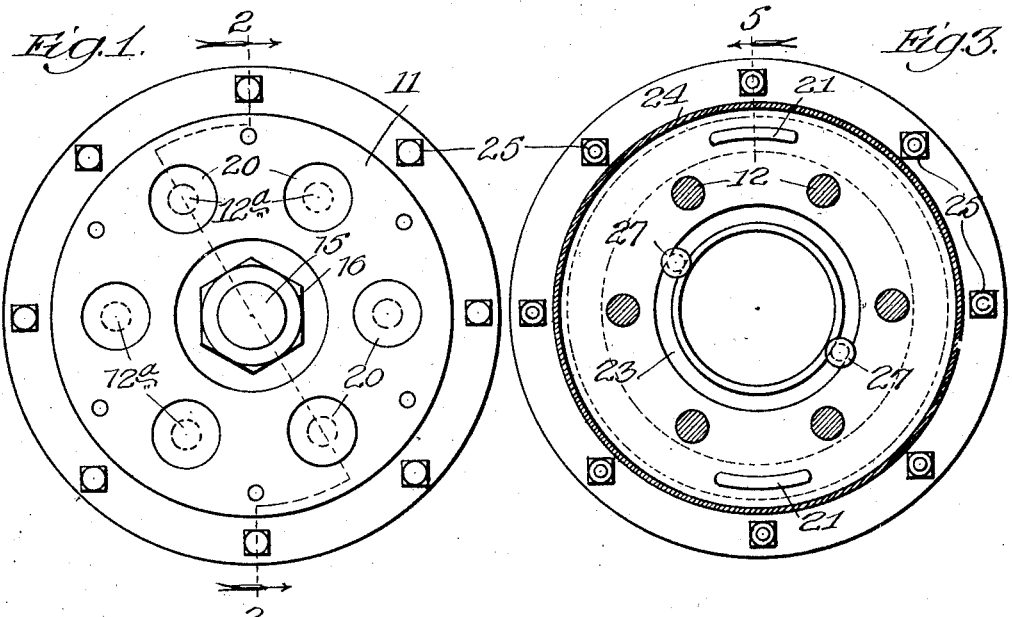
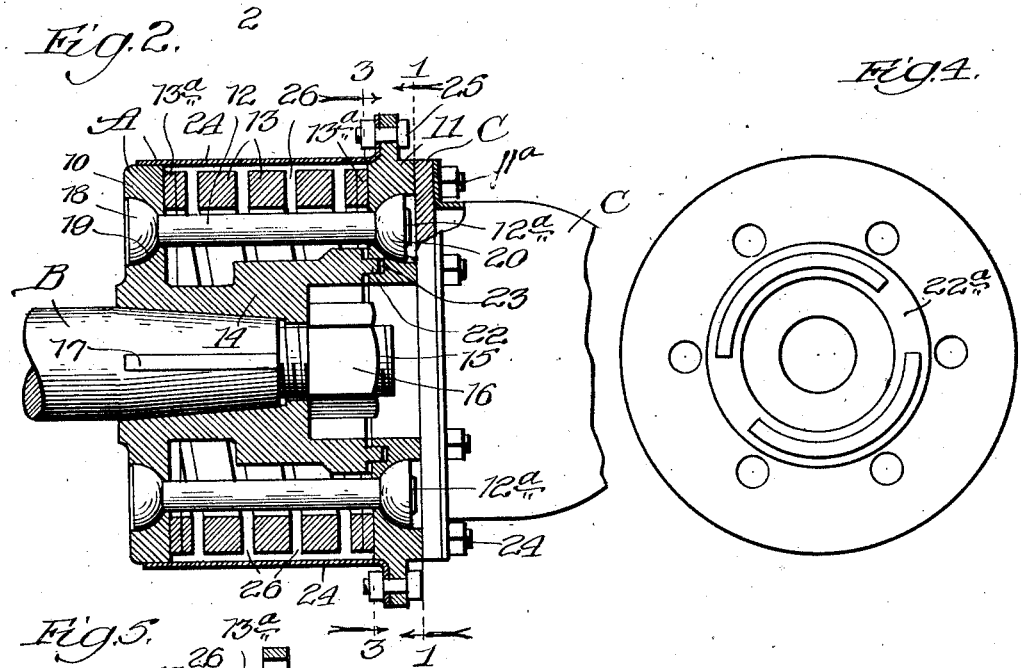
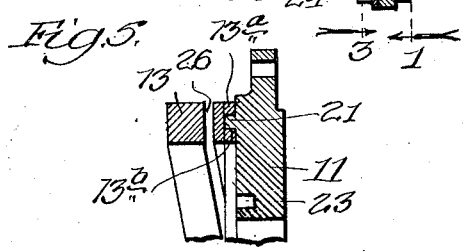
Inventor
George F. Eckart
By Dyrenforth, Lee, Chritton & Wiles
Attys.

Patented May 7, 1929.

UNITED STATES PATENT OFFICE.

1,712,138

GEORGE F. ECKART, OF SOUTH BEND, INDIANA, ASSIGNOR TO GEORGE A. CHRITTON, TRUSTEE.

SHOCKLESS DRIVE.

Application filed September 17, 1926. Serial No. 136,114.

This invention relates to a shockless drive and is particularly intended to be used in drives of automobiles, trucks and the like.

An object of the invention is to provide an improved form of flexible or yieldable connection which is inserted between the engine and the rear axle of an automobile, preferably between the propeller shaft and the differential, so as to prevent in a large measure the inequalities of the drive in the engine being transmitted to the rear axle and also to prevent the road shocks received being transmitted to the transmission and to the engine.

These and other objects as will hereinafter appear are accomplished by this device which is fully described in the following specification and shown in the accompanying drawing, in which:

Figure 1 is a front elevation of the device as viewed on the line 1—1 of Fig. 2;

Fig. 2 is a longitudinal section of the same on the broken line 2—2 of Fig. 1;

Fig. 3 is a transverse sectional view on the line 3—3 of Fig. 2;

Fig. 4 is a view similar to Fig. 3, but looking in the reverse direction from the line 3—3 of Fig. 2; and Fig. 5 is a partial section on the line 5 of Fig. 3.

The embodiment illustrated shows the shockless drive or flexible coupling shown generally in Fig. 2 as A connecting a differential pinion shaft B with a universal joint C which forms part of the propeller shaft of an automobile.

The shockless drive or flexible coupling comprises essentially two opposing flanges 10 and 11 which are flexibly connected by means of rods 12 and by a compression spring 13 which forces the flanges outwardly into contact with the ends of the rods 12. The flange 10 has a hub 14 which has a central conical bore to receive the tapered shaft B, the end of the shaft 15 being threaded to receive a nut 16 which holds the flange 10 firmly in position thereon. The hub 14 and the tapered portion of the shaft B are provided with suitable key-ways to receive the key 17. One end of each of the rods 12 is provided with a hemispherical portion 18 which is secured thereto in any desired manner and this hemispherical ball is seated in a hemispherical socket 19 so as to permit the ball to move in the socket as the flanges are turned with respect to each other. The opposite end of each rod 12 is likewise supplied with a similar shaped ball 20 which is preferably threaded so as to be screwed upon the end of the rod 12 after which the end of the rod which protrudes therethrough is riveted over as shown at 12ª.

The spring 13 is provided at each end with a ring 13ª which is secured thereto in any suitable way as by brazing or welding. Recesses 13ᵇ are provided in this ring which snugly fits over extensions or keys 21 carried by the flanges 10 and 11. Two or more of these keys or extensions 21 are secured to each of the flanges so as to insure a substantially uniform application of the torque of the spring 13 through the flanges.

The hub 14 of the flange 10 projects forward into contact with the flange 11 and is provided with an annular tongue 22 which is adapted to fit snugly in an annular groove 23 in the flange 11.

The universal joint C is secured to the flange 11 by means of stud-bolts 11ª, the universal joint being a well known construction which operates in the usual manner.

Thus, it will be seen, that as power is applied to the flange 11 through the universal joint C, the flange 11 will be turned with respect to the flange 10 thereby simultaneously moving all of the radius rods an equal amount and in so doing causes the flanges 10 and 11 to approach each other, thereby further compressing the spring 13 which is already under an initial compression. At the same time this movement places the spring under a tortional strain which tends to return the flanges 10 and 11 to their normal position in which the radius rods 12 are substantially parallel to the axis of the shaft B.

At the same time, the annular tongue 22, being coaxial with the axis of the shaft B, the annular groove 23 of the flange 11 which fits over the tongue 22 is likewise guided in a path coaxial with this axis, so that any whip of these elements and of the universal joint C connected thereto is prevented.

A stamped or pressed metal cover 24 is secured to one of the flanges as by means of bolts 25, the cover 24 making contact with the other flange so as to exclude dust and grit and to retain heavy oil or grease which is placed in the enclosed space 26 between the cover 24 and the hub 14.

Thus it will be seen that a very compact and efficient form of shockless drive or flexible coupling is provided which prevents in a large measure the transmission of shocks from the engine to the rear wheels and vice versa, and one which is particularly free from whip and vibration.

Two rivets or the like having heads 27 are set opposite each other across the annular groove 23. The annular tongue is interrupted at two points 22ª at opposite pivots in the circle so that when assembled the heads 27 fall in the spaces 22ª. The flanges are so set that five degrees of angular displacement of the elements in "reverse" will cause the heads 27 to strike the ends of the tongues 22, after which the drive is positive. For the forward drive, the space 22ª permits the flanges to have an angular displacement of fifteen degrees.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:—

1. In a coupling of the class described, two spaced flanges, a series of members flexibly connecting said flanges, a spring pressing outwardly upon said flanges, said spring being secured at its two ends to said flanges, one of said flanges having a hub with an axial hole adapted to receive a shaft, complementary guide members carried by the hub of one flange and by the other flange for guiding the last named flange, and a dust-proof cover carried by one of said flanges and having a bearing on the other.

2. In a coupling of the class described, two spaced flanges, a series of members flexibly connecting said flanges, a spring pressing outwardly upon said flanges, said spring being secured at its two ends to said flanges, one of said flanges having a hub with an axial hole adapted to receive a shaft, the other flange having means adapting it to be secured to a universal joint, and complementary guide members carried by the hub of one flange and by the other flange for guiding the last named flange.

3. In a coupling of the class described, two spaced flanges, a series of members flexibly connecting said flanges, a spring outside said members and pressing outwardly upon said flanges, said spring being secured at its two ends to said flanges, and cooperating means on said flanges for keeping said flanges in alignment.

4. In a coupling of the class described, two spaced flanges, a series of members flexibly connecting said flanges, a spring outside said members and pressing outwardly upon said flanges, said spring being secured at its two ends to said flanges, and means for keeping said flanges in alignment, said means serving also to limit the relative rotational movement of said flanges.

5. In a coupling of the class described, two spaced flanges, a series of members flexibly connecting said flanges, a spring outside said members and pressing outwardly upon said flanges, said spring being secured at its two ends to said flanges, and cooperating means on said flanges for keeping said flanges in alignment, said means serving also to limit the relative rotational movement of said flanges.

6. In a coupling of the class described, two spaced flanges, a series of members flexibly connecting said flanges, a spring outside said members and pressing outwardly upon said flanges, said spring being secured at its two ends to said flanges, means for keeping said flanges in alignment, and a cover carried by one flange and rotatably bearing on the other.

7. In a device of the character set forth, spaced flanges, a series of members flexibly connecting said flanges, a spring outside said members and pressing outwardly upon said flanges, said spring being secured at its two ends to said flanges, means for keeping said flanges in alinement, and a shaft connected to one of said flanges.

In testimony whereof I have hereunto set my hand this 31st day of August, 1926.

GEORGE F. ECKART.